J. J. Fifield,
Pipe Coupling.

No. 91,319. Patented June 15, 1869.

Witnesses.
S. N. Piper.
J. R. Snow.

Inventor.
J. J. Fifield.
By his attorney.
R. H. Eddy.

United States Patent Office.

JAMES J. FIFIELD, OF EAST BOSTON, MASSACHUSETTS.

*Letters Patent No. 91,319, dated June 15, 1869.*

---

IMPROVEMENT IN PIPE-COUPLING.

---

The Schedule referred to in these Letters Patent and making part of the same.

---

*To all persons to whom these presents may come:*

Be it known that I, JAMES J. FIFIELD, of East Boston, in the county of Suffolk, and State of Massachusetts, have invented a new and useful Pipe-Coupling; and I do hereby declare the same to be fully described in the following specification, and represented in the accompanying drawings, of which—

Figure 1:
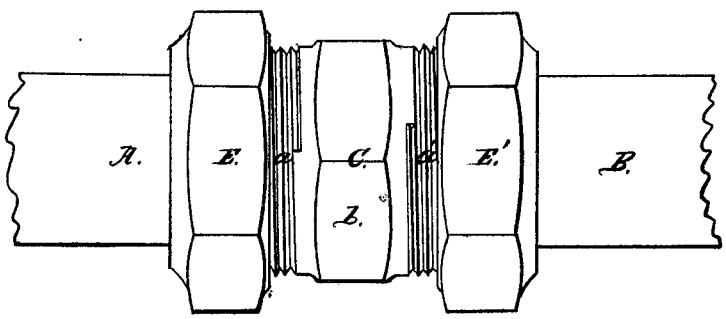

Figure 1 denotes a side view, and

Figure 2:
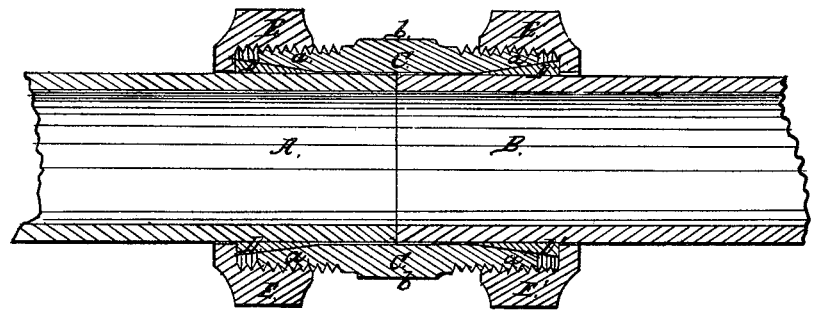

Figure 2, a longitudinal section of two iron pipes, connected by my said coupling.

Figure 3:
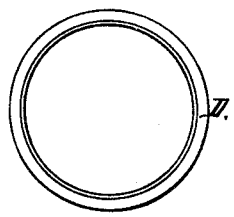

Figure 3 is a front view, and

Figure 4:
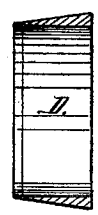

Figure 4, a section of one of the wedge-rings used in such couplings.

In carrying out my invention, I employ a short tube, or auxiliary pipe, to receive the ends of the two pipes to be coupled, they being inserted into such tube from its opposite extremities. On and around the coupling-tube I cut a male screw, extending from each end of the tube toward its middle and to a prismatic flange, circumscribing the coupling-tube. The bore of the coupling-tube I construct bell-mouthed, or tapering near each end of it, such being to receive a ring-wedge, to encompass the pipe to be connected to the coupling-tube.

I also employ to each of the screws of the coupling-tube a nut, to screw thereon and against the larger end of the wedge-ring, so as to crowd the wedge-ring into the coupling-tube.

In the drawings—

A B denote the two coupled pipes, and C the coupling-pipe, *a a'* being the screws, and *b* being the prismatic flange of such pipe C.

D and D' are the two wedge-rings, and

E and E' are the prismatic nuts, screwed on the screws *a a'*, and against the buts, or larger ends of the wedge-rings.

The nuts, when so screwed against the wedge-rings, operate to crowd the said rings into the conical mouths of the tube C, and consequently force them to contract such rings, so as to cause them to embrace and fit closely to the pipes A B, and make therewith and with red-lead, putty, or other suitable joint-tightening material or compound previously inserted in the said mouths, tight joints between the pipe and the coupling-tube. The taper of each of the ring-wedges, or wedge-rings, both inside and outside, should be such as to enable the putty to flow between the opposite surfaces of the coupling-pipe and the pipe surrounded by the wedge-ring.

The prismatic flange *b* is to enable the coupling-tube C to be held stationary, by a wrench or other suitable device, while either of the nuts is being set up or unscrewed by means of another wrench applied to such nut.

This coupling will be found to be very convenient for connecting pipes or tubes used in the conveyance of water or gas, as it saves all necessity of cutting screws in such pipes at their ends to be coupled, as well as revolving the pipes to effect the coupling of them together.

I claim, therefore, the combination and arrangement of the two screw-nuts, and the two wedge-rings, with the duplex bell-mouthed coupling-pipe C, applied, or to be applied to the two pipes A B, the same being substantially as and for the purpose of effecting the coupling of such pipes A B, as set forth.

JAS. J. FIFIELD.

Witnesses:
R. H. EDDY,
F. P. HALE, Jr.